Oct. 25, 1949  R. H. WISWALL, JR  2,486,351
SOLVENT STABLE METAL PHTHALOCYANINE PIGMENTS
AND METHOD OF MAKING THE SAME
Filed Jan. 13, 1948  4 Sheets-Sheet 1

INVENTOR
RICHARD H. WISWALL, JR.
BY
ATTORNEY

Oct. 25, 1949    R. H. WISWALL, JR    2,486,351
SOLVENT STABLE METAL PHTHALOCYANINE PIGMENTS
AND METHOD OF MAKING THE SAME
Filed Jan. 13, 1948    4 Sheets-Sheet 2

INVENTOR
RICHARD H. WISWALL, JR.,
BY
ATTORNEY

Oct. 25, 1949  R. H. WISWALL, JR  2,486,351
SOLVENT STABLE METAL PHTHALOCYANINE PIGMENTS
AND METHOD OF MAKING THE SAME
Filed Jan. 13, 1948  4 Sheets-Sheet 3
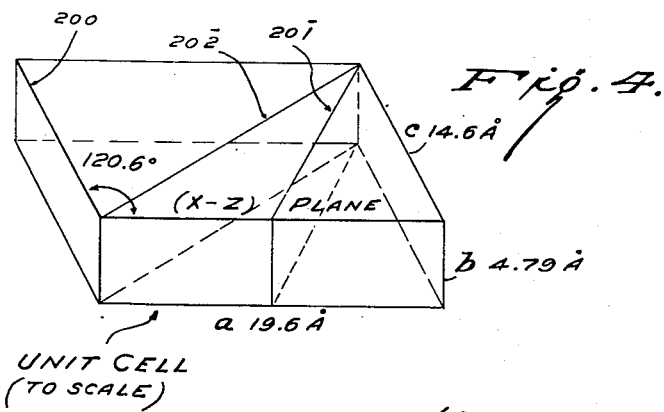
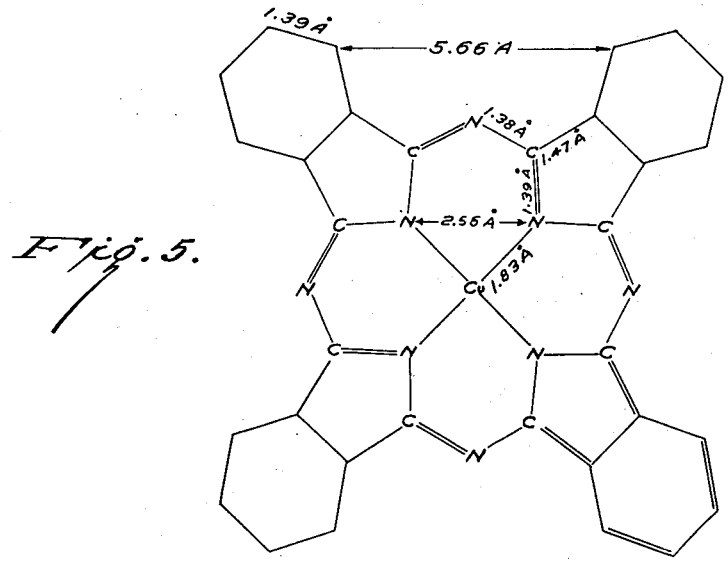
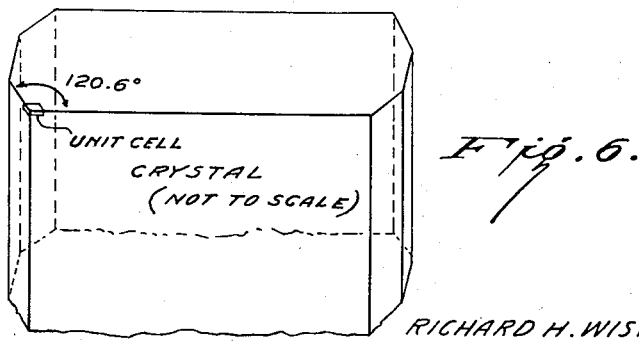
INVENTOR.
RICHARD H. WISWALL, JR.,
BY
ATTORNEY Patented Oct. 25, 1949

2,486,351

UNITED STATES PATENT OFFICE 2,486,351

SOLVENT STABLE METAL PHTHALOCYANINE PIGMENTS AND METHODS OF MAKING THE SAME

Richard H. Wiswall, Jr., Oak Ridge, Tenn., assignor to American Cyanamid Company, New York, N. Y., a corporation of Maine Application January 13, 1948, Serial No. 1,924

8 Claims. (Cl. 260—314.5)

This invention relates to improved tetrazaporphine pigments and particularly to sulfuric acid stable metal phthalocyanine pigments.

A number of pigments of the tetrazaporphine group have been prepared. Of these pigments only the phthalocyanines (tetrabenzo tetrazaporphine) have achieved commercial success by reason of the exceptional fastness to the light and weather of a number of these phthalocyanines such as for example, the copper, zinc, iron, cobalt and nickel phthalocyanines. Because of the practical importance of the phthalocyanines it has been customary in the art to refer to all the metal and metal free tetrazaporphine pigments as pigments of the phthalocyanine type. Typical tetrazaporphines other than phthalocyanine itself are tetranaphthotetrazaporphines, alkyl and aryl derivatives of phthalocyanine, halogenated phthalocyanines, tetrazaporphines with fused heterocyclic rings, and the like. Even the phthalocyanine pigments are subject to a series of drawbacks, namely that when exposed to most organic liquids such as those encountered in coating compositions, for example, aromatic hydrocarbons, esters and the like, they tend to increase in particle size forming larger crystals averaging much larger than 2 microns and as a result covering power and tinctorial value drop very severely. In addition pronounced shade changes occur, frequently rendering the colored composition eventually useless. The difficulties involved are particularly encountered with the finely divided pigments prepared by various precipitation methods, such as for example, acid pasting in sulfuric acid. With such methods of preparation finely divided pigments are obtained but as soon as they are brought into contact with the ordinary organic vehicles for paints, lacquers and plastics, crystals begin to grow and the tinctorial value drops very sharply.

The disadvantages discussed above have very seriously interfered with the exploitation of the pigments of the phthalocyanine type because these pigments are normally used to a large extent in coating compositions such as inks, paints, lacquers, plastics and the like which contain in the vehicles organic liquids inducing crystal growth hereafter referred to as crystallizing liquids. In spite of the extraordinarily valuable properties of great light fastness and in many cases pronounced chemical stability, pigments of the phthalocyanine type have been seriously restricted in their fields of usefulness.

Many attempts have been made to solve the problem without success practically except that certain coatings which have been applied to the surface of finely divided particles of the phthalocyanine pigments have somewhat increased stability against crystallizing liquids. These coated particles however, have undesirable properties such as decreased strength. They have therefore not achieved real practical success.

A number of phthalocyanine pigments such as for example, copper phthalocyanine have been halogenated and where halogen has been introduced in some cases, the difficulties encountered with crystallizing liquids have not arisen. However, these halogenated pigments are of different shades from the unhalogenated pigments and in most cases cannot be used in place of them.

The present invention produces halogen free phthalocyanine pigments with particle size not over two microns on the average which are stable against crystal growth in contact with the ordinary crystallizing organic liquids. The present invention is particularly advantageous with phthalocyanine pigments which are sulfuric acid stable and therefore can be purified by acid pasting without loss of metal. Examples of such pigments are copper, nickel, cobalt, iron and zinc phthalocyanines. The acid stability is usually predicated on a metal with an atomic radius which just fits into the center of the porphine ring.

Essentially, the improved solvent stable pigments of the present invention are preferably produced by a novel process which involves first transforming the finely divided phthalocyanine pigment into the coarse crystal form with large particle size and these crystals are then ground with a grinding aid, preferably at least equal to the weight of the phthalocyanine pigment. The grinding aid may be a material such as sodium chloride which can be removed by leaching with water, calcium carbonate which can be removed by acid leaching, or finely divided materials such as diatomaceous earth, blanc fixe, powdered silica, etc., and the like which in many cases are desirable pigment extenders and do not have to be removed. Soluble organic compounds such as carbohydrates may also be employed.

The ground material which is reduced to an average particle size well under two microns and usually under one micron, is then subjected to the action of crystallizing liquids. Slight growth in crystal size results but the average particle size still remains under two microns and mostly under one micron and the material is then stable against further crystal growth in crystallizing liquids and can be incorporated in coatings such as inks, paints, lacquers and the like and stored for a long period of time. The stable pigments of the present invention are also characterized by a marked shift in shade toward the green.

There is a very essential difference between the phthalocyanine pigments which have hitherto been known and the solvent stable pigments of the present invention. The ordinary copper phthalocyanine pigments when subjected to X-ray and electron microscope examinations show diffraction spectra which prove that they consist of unstable phthalocyanine crystals associated with more or less material which has often been reefrred to as amorphous and which might more properly be designated as broken or imperfect crystals. These crystals are of an unstable form having a molecular structure which will be discussed in more detail below. The material after grinding with the aid of a solid grinding aid in the second step of the preferred process of the present invention is almost completely crystalline, the crystals being of the unstable configuration but free from any material content of imperfect or broken crystals or amorphous particles. When these small, predominantly perfect crystals are then subjected to the action of an organic liquid which normally exerts a crystallizing action on phthalocyanine pigments there is only a slight growth in crystal volume but the crystal does change form completely into a stable crystal structure, the molecular arrangement of which will be described in greater detail below.

It is not definitely known why the perfect, small, unstable crystals produced in the second step of the preferred process of the present invention increase only very slightly in dimensions and become completely transformed into stable crystals whereas ordinary phthalocyanine pigments increase continuously in size until they cease to become useful pigments. It is, therefore, not intended to limit the present invention to a definite theory. I believe, however, that it is quite probable that the imperfect and broken crystals are either more soluble or present surfaces which are capable of adding on further imperfect crystals continuously, whereas the slight increase in size which is the most that takes place when the perfect crystals are transformed from the unstable into the stable form, may be due to a small increase in volume of the crystals when their molecules rearrange themselves into the stable configuration. It is also possible that there may be an extremely limited growth from a few perfect crystals which may be present in very minor amounts too small to show by X-ray investigation. Other characteristics, depending on possible surface differences between perfect and imperfect crystals, may also play a part.

While the exact mechanism for the change of small, unstable, perfect crystals to stable, small crystals of little or no greater size, may not be entirely known there is no question that a change in crystal structure takes place. This is not a hypothesis or a theory, but is capable of precise measurement from X-ray diffraction data. It is proven by the fact that the phthalocyanine pigments of the preesnt invention show an X-ray diffraction spectrum which is widely different from that of the unstable form of pigments which was the only crystalline form hitherto obtainable in a finely divided state. The two diffraction patterns have in common only their line of maximum intensity which occurs in the two at an interplanar spacing in the crystal lattice, at about 12.7 Å. which corresponds to the spacing of the planes in the c direction in the crystal. The two crystal forms have no other relation. The common unstable crystal form does not have other lines of high intensity whereas the product of the present invention shows a line of second greatest intensity at an interplanar spacing of about 9.7 Å., and a line of third greatest intensity at an interplanar spacing of 3.75 Å. The above figures for interplanar spacing are for the copper phthalocyanine. The corresponding X-ray diffraction patterns of the stable crystals of zinc phthalocyanine and of nickel phthalocyanine, respectively, resemble very closely that of copper phthalocyanine although there are slight displacements of the peaks due to minor differences in the dimensions of the unit cells of the respective crystals.

While the difference in crystal structure of the stable and unstable finely divided pigments particles is very marked and the product of the present invention is characterized by definite sharp diffraction spectral lines or bands, which find no counterpart in the unstable crystal form, it is not known exactly why the results of the present invention are obtained when grinding is carried out with a solid grinding aid and the invention is therefore not intended to be limited to any particular theory of why the definite crystal change takes place.

In the case of most improved pigments, a compromise results. That is to say, one desirable characteristic is usually obtained at the expense of certain other desirable characteristics. The present invention belongs to one of the small number of cases where the great improvement in characteristics is obtained without substantially offsetting drawbacks. Thus, for example, the product of the present invention, although showing an extraordinary stability toward crystallizing liquids does not lose high tinctorial value, and exhibits greatly improved texture, strength development and flow properties.

The dry grinding step with the grinding aid may be carried out in any conventional grinding equipment such as ball mills, rod mills and the like and it is an advantage of the present invention that the particular equipment used is not critical and that ordinary apparatus is applicable. While the nature of this grinding is not critical, it must be continued in every case until the particle size has been reduced below two microns and preferably for the most part considerably below one micron. Generally a finely divided pigment such as an acid pasted phthalocyanine pigment is the starting material for the process of the present invention. It is desirable to continue the grinding until substantially all the tinctorial value of the original acid pasted pigment has been attained.

The step of stabilizing the ground material by exposing it to an organic liquid, for example xylene, toluene, ethyl acetate, etc., which exert a crystallizing action is also not critical. All that is necessary is that the exposure be for a sufficient time so as to produce the final stable crystalline modification. Moderate heat accelerates the stabilizing step. Since the pigment is frequently used in coating compositions containing organic liquids which exert crystallizing action, the ground material may be directly introduced into such compositions and the production of the stable pigments will then take place in the same step which results in an incorporation of the pigment with its vehicles.

An alternative procedure for preparing solvent stable phthalocyanine pigments of high tinctorial value is to combine the three steps described above into one single step. In this procedure crystallization, grinding in the presence of a grinding aid and the stabilization take place in the same operation. Acid pasted phthalocyanine, the grinding aid, and sufficient organic crystallizing liquid to produce a plastic magma are thoroughly worked in a suitable apparatus to yield intensive mixing. Under these conditions no large initial crystals are formed. Apparently as soon as any crystallization occurs, the crystals are broken and stabilized by the liquid present to yield very fine permanently stable crystalline pigment particles. This alternative process for preparing solvent stable phthalocyanine pigments is not claimed as such in the present application but forms the subject matter of the copending application of Serge Loukomsky, Serial No. 718,884, filed December 27, 1946.

The invention will be described in conjunction with the drawings in which:

Fig. 4 is a perspective of a unit cell of a stable phthalocyanine crystal;

Fig. 5 is a graphic formula for copper phthalocyanine showing certain atom spacings.

Figure 7:
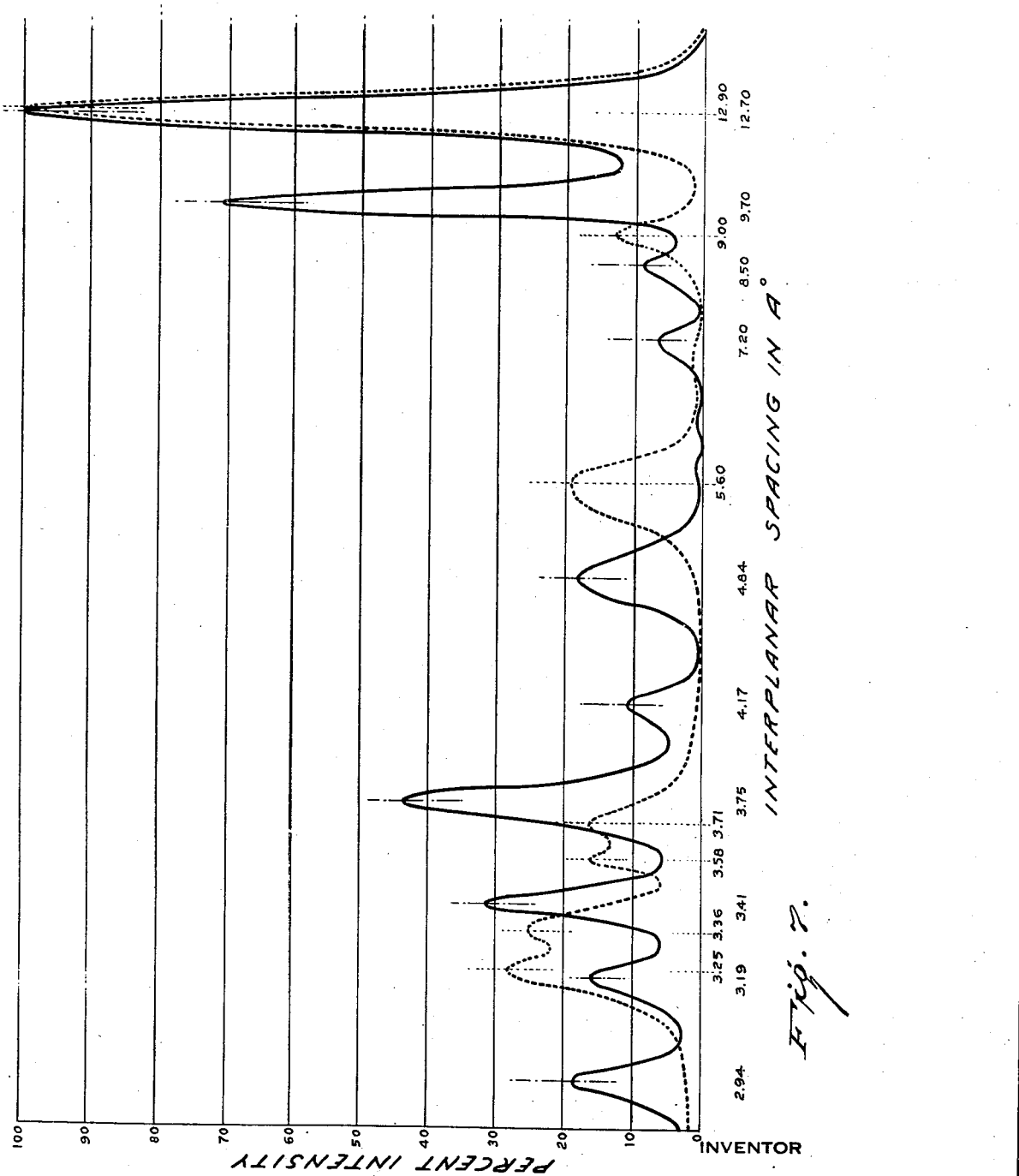

Fig. 6 is a perspective of a stable crystal of copper phthalocyanine showing one unit cell, and Fig. 7 is a pair of curves of the X-ray diffraction pattern of stable and unstable copper phthalocyanine, the solid line being of the solvent stable finely divided pigment produced by the present invention and the dotted line the solvent unstable pigment which has been the only form in which finely divided phthalocyanine pigments have been obtainable in the past. The abscissae are on the customary non-uniform scale of interplanar crystal spacing as drawn by a recording spectrometer which has a mechanically movable Geiger counter. The vertical scale is in percent of the strongest line. The figures for the various spectral lines of the solid and dotted curves are as follows:

| $\lambda$. Interplanar Spacing | Per Cent Intensity of Strongest Line | $\lambda$. Interplanar Spacing | Per Cent Intensity of Strongest Line |
|---|---|---|---|
| 12.7 | 100 | 12.9 | 100 |
| 9.7 | 72 | 9.0 | 13 |
| 8.5 | 9 | 5.60 | 19 |
| 7.2 | 7 | 3.71 | 16 |
| 4.84 | 18 | 3.58 | 16 |
| 4.17 | 11 | 3.36 | 25 |
| 3.75 | 44 | 3.25 | 28 |
| 3.41 | 32 | | |
| 3.19 | 16 | | |
| 2.94 | 18 | | |

The coincidence of one diffraction spectral line in the region of 12.7 Å. to 12.9 Å. is due, as stated above, to the only characteristic which the two crystals have in common, namely, the spacing of planes in the c direction. In every other respect it will be seen that the two crystals have no common characteristics.

*Example 1*

Crude copper phthalocyanine is acid-pasted, in the presence of xylene sulfonic acid, dried and crystallized by treatment with toluene or by heating in air at high temperatures or in water under pressure at 200° C. The crystallized product obtained, which shows a typical Robertson (J. Chem. Soc. page 615 (1935)) complex X-ray diffraction pattern, is then carefully dried and mixed with approximately 9 parts of "Cerelose" (d-glucose) and charged into a ball- or pebble-mill. Milling may be continued for some 12 to 24 hours to assure that the pigment has been thoroughly ground. The assistant is then removed by leaching with water. The copper phthalocyanine now no longer possesses the Robertson X-ray diffraction pattern but instead exhibits a new pattern. At this state, the pigment possesses substantially the same color value as the original acid-pasted material. On flushing in toluene or similar crystallizing liquid, this product attains a condition of constant color value which is about 70% that of the acid-pasted copper phthalocyanine. On removing the crystallizing liquid a very finely divided crystalline pigment is obtained which is stable even when boiled in xylene for more than an hour, keeps indefinitely even at a temperature of 54° C. which corresponds to maximum temperature conditions encountered in the holds of cargo ships operating in the tropics, and can be incorporated into inks, lacquers or other coating compositions containing crystallizing liquids without substantial change in color value on standing. The final pigment exhibits the X-ray diffraction pattern shown in the solid line in the drawing with the lines of maximum intensity at an interplanar spacing of about 12.70 Å., and second and third strongest lines at 9.70 and 3.75 Å. If desired the pigment may remain in suspension in the crystallizing liquid and be sold as a suspension which also keeps extremely well.

The final pigment is furthermore characterized by its ultimate particles being entirely crystalline when examined with the electron microscope. The individual crystalline particles are on the average less than 1 micron in length although occasionally an individual crystal slightly larger than 1 micron is observed. Examined with a visual microscope, the ultimate crystals are not clearly discernible.

Figure 1:
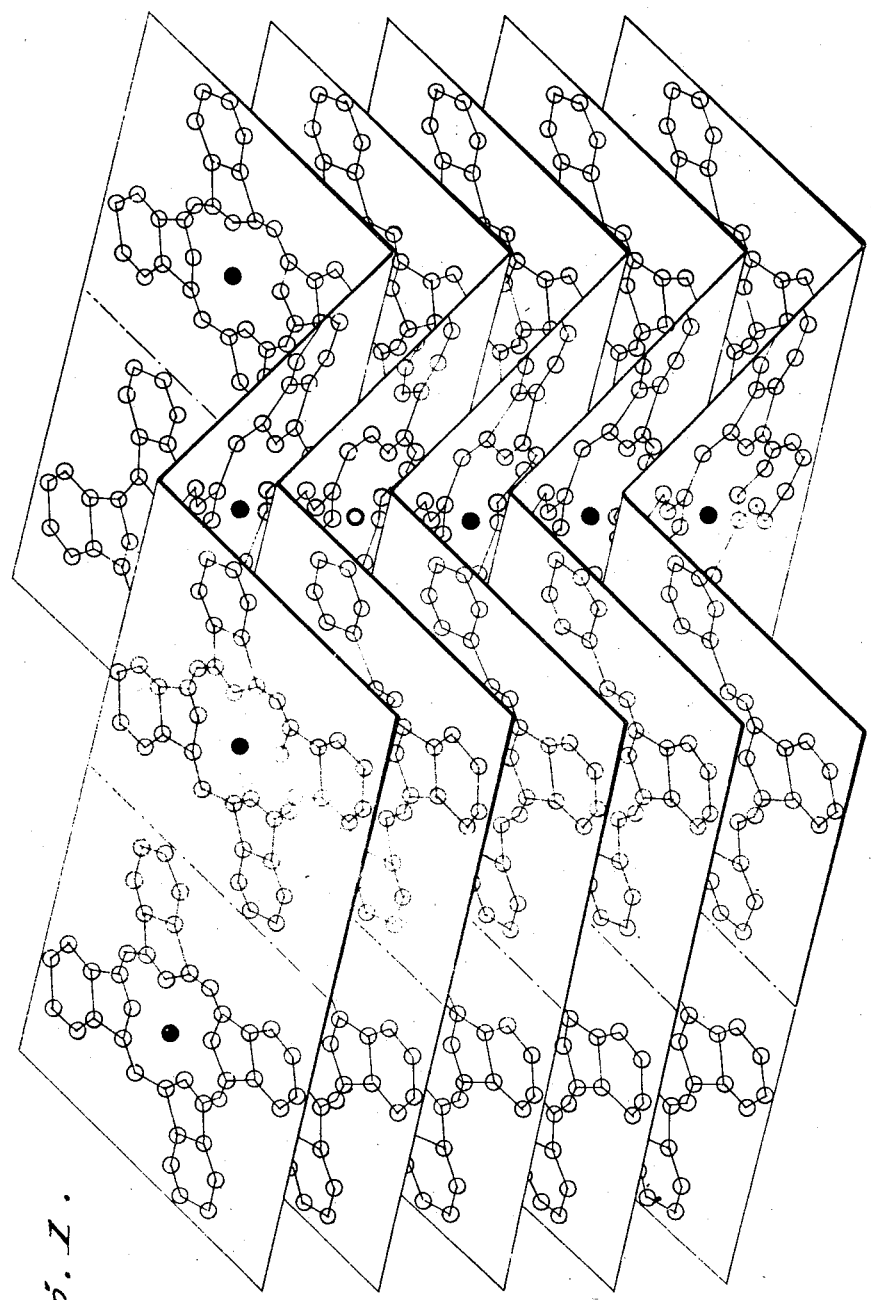
Fig. 1 is a perspective of the arrangement of the planes in the crystal of stable copper phthalocyanine.

The crystal form of the stable pigment as determined by X-ray diffraction spectra is shown in Figs. 1, 2, 4, 5 and 6. It will be noted that the phthalocyanine molecules in the crystal when projected onto a plane parallel to the planes shown in Fig. 1 are arranged in parallel rows (see Fig. 2), the copper atom being shown with a solid circle and the carbon and nitrogen atoms being shown as single circles as can be determined by comparison with the structural formula shown in Fig. 5.

Figure 2:
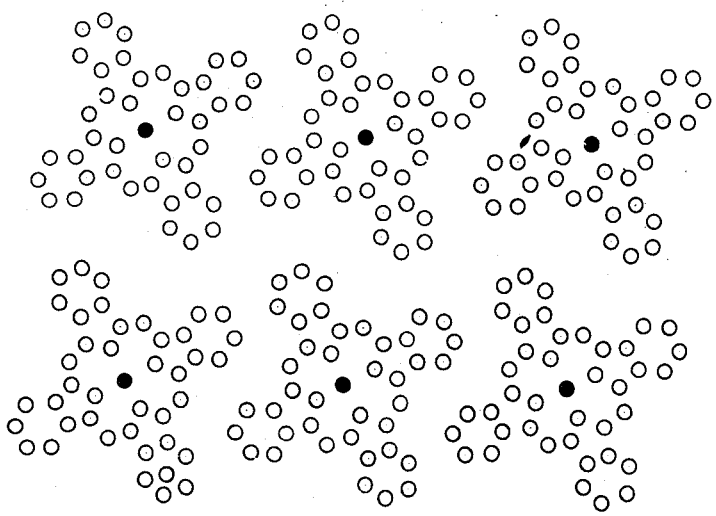
Fig. 2 is a projection of the stable copper phthalocyanine molecules taken in a plane parallel to the crystal planes in Fig. 1.
Figure 3:
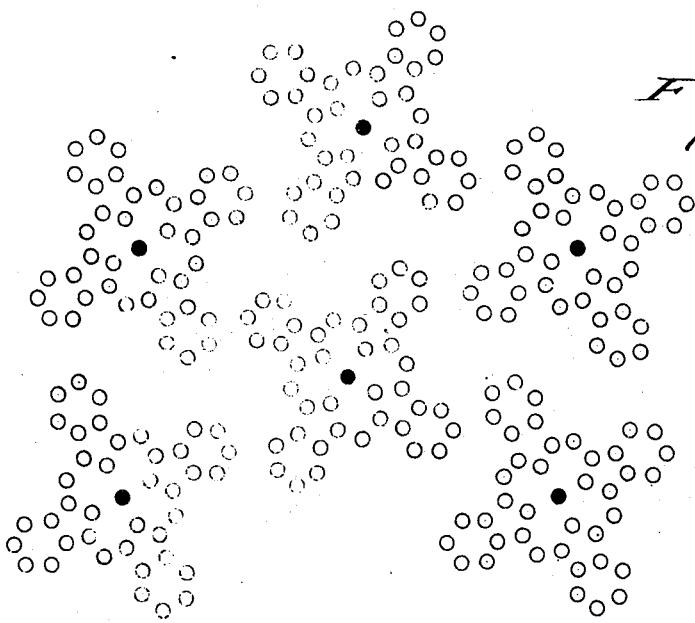
Fig. 3 is a corresponding projection from a normal (i. e., unstable) crystal.

When the normal pigment crystals which are unstable are examined by X-ray diffraction and their crystal structure calculated therefrom, the projection of the molecules on the corresponding plane which is shown in Fig. 3 is different from that of the stable crystals in Fig. 2. The copper phthalocyanine molecules are staggered and not in parallel rows. The two types of pigments, stable and unstable, resemble each other only in the spacing of one set of planes of the crystal. In every other dimension they are entirely different. The radical difference of crystal form determines the physical properties of the final pigment but it is not known why one crystal form shows extraordinary stability against crystallizing organic liquids whereas the former is quite unstable.

A study of Figs. 2 and 3 will show that the principal change from stable to unstable crystal may be thought of as a rotation or shifting of the copper phthalocyanine molecules in one set of crystal planes. The spacing in between planes, which is in the c dimension is not altered. It is possible that the rotation of the molecules may account for part or all of any increase in crystal volume which is noted in the transformation from unstable to stable crystal form.

The change in molecular configuration is often associated with differences in light absorption. In the present case this is also true and the small, stable crystals which constitute the product of the present invention are characterized by a definitely greener shade of blue, whereas, the unstable crystals exhibit a redder shade. The color difference is not great, but in certain uses of the pigment, is sufficient to be of practical significance. For many purposes the greener shade of blue is preferred and it is an advantage of the present invention that the stability against crystallizing organic liquids of the products of the present invention is associated with an advantageous shade change for many applications.

Fig. 7 shows the actual curves of the X-ray diffraction spectra of a stable and unstable copper phthalocyanine crystal.

Example 2

Crude copper phthalocyanine is acid-pasted, dried and crystallized by treatment with ethyl acetate. The crystallized product obtained, which shows the typical Robertson complex crystal diffraction pattern, is then carefully dried and mixed with approximately 3 to 9 parts of common salt and charged into a ball- or pebble-mill. Milling is continued for about 36 hours, depending on the fineness of pigment desired, and the salt then removed by solution in water. The remaining ground crystallized copper phthalocyanine on suspension in the crystallizing liquid attains a condition of constant color value which is about 70% of that of acid-pasted copper phthalocyanine. The product is solvent stable to boiling in xylene for at least one hour and a bright color of a desirable greenish-blue shade is obtained therewith, and has the same crystal structure as the product of Example 1.

Example 3

Crude copper phthalocyanine is acid-pasted, dried and crystallized by treatment with glycol. The crystallized product which is substantially the same as in Examples 1 and 2 is freed from glycol, mixed with approximately 9 parts of calcium carbonate, and ground in a rod-mill until the desired fineness is obtained. The calcium carbonate is then removed by treating with dilute hydrochloric acid solution or other acid which will dissolve the calcium carbonate without affecting the copper phthalocyanine. The pigment is then washed free of acid and treated with a crystallizing liquid such as toluene for 1 to 4 days at 60–70° C., whereupon the pigment is transformed into an exceedingly small Robertson type complex crystal form which possesses a color value of about 70% of that of acid-pasted copper phthalocyanine and has the same crystal structure as the product of Example 1.

If it is desired to produce a pigment containing ground calcium carbonate as an extender it is not necessary to remove the calcium carbonate by acid treatment and the extended pigment may be suspended in toluene or other crystallizing liquid obtaining copper phthalocyanine of the same crystal form as described above. A similar extended pigment is obtained when silica is used instead of calcium carbonate.

Example 4

1 part of copper phthalocyanine, acid-pasted as in Example 1, dried and ground, is dry mixed with 5 parts of fine sodium bicarbonate in a dough mixer equipped with sigma blades. When the blend is homogeneous 2.15 parts of commercial xylene are added, approximately 15 minutes being taken for the addition. While the plastic magma is being kneaded, 3 more parts of sodium bicarbonate are added slowly covering a period of from 30 to 60 minutes. The reason for the additional sodium bicarbonate is to maintain the magma at the condition of maximum stiffness, i. e., just beyond the point of granulation. If granulation begins, small amounts of xylene are added to restore the conditions of maximum working. The working is continued for 4 hours. The xylene wetted magma is then dried (under vacuum if so desired), slurried in water, filtered, washed free from salts, and finally air-dried. A finely divided tinctorially strong crystalline phthalocyanine pigment is obtained which does not change in strength even if heated in xylene at the boil for one hour, and has the same crystal structure as the product of Example 1.

Example 5

Acid-pasted zinc phthalocyanine is boiled under toluene for 2 hours. Large rod-like crystals are formed possessing no pigment properties. These crystals are filtered and dried.

1 part of these crystals together with 15 parts of dry sodium chloride are ball-milled for 24 hours. After which 30 parts of water are introduced and the milling continued for 2 hours. The charge is then removed from the ball mill by flushing with additional water, filtered, washed free from salt, and dried at 70° C. The ground crystals are placed in toluene, boiled for 1 hour, and allowed to cool overnight. A soft, very bright blue, solvent stable pigment is obtained, the product showing X-ray diffraction spectrum with its principal lines in substantially the same position, in the case of copper phthalocyanine, displacements of the lines being minor and due to slight differences in the dimensions of the unit cell.

Example 6

10 parts of nickel phthalocyanine, acid-pasted by the method described in Example 1 is refluxed under xylene for 4 hours. A slow crystallization occurs; the crystals being fine needles. The crystallized product is filtered and dried. 5 parts of crystallized material are ball-milled with 70 parts of sodium chloride in a dry state for 24 hours. A sufficient amount of water to form a fluid paste is then added, followed by 4 hours of additional ball-milling. The charge is then screened, filtered and washed free from salt. The pigment press cake is then dehydrated azeotropically under toluene, and finally boiled under toluene for 5 hours.

The final dried, very finely divided pigment is solvent stable and suitable for producing bright olive green shades in inks, paints, plastics, etc., the product showing X-ray diffraction spectrum with its principal lines in substantially the same position, in the case of copper phthalocyanine, displacements of the lines being minor and due to slight differences in the dimensions of the unit cell.

Example 7

1 part crude copper phthalocyanine, prepared according to the procedure described in U. S. P. 2,318,787 and composed essentially of large crystals 5 microns to 50 microns in size, is dry ball-milled for 4 days with 12 parts of sodium chloride. A 1% solution of isopropyl naphthalene sulfonate is then introduced into the ball mill and the milling continued for 4 hours or until a smooth slurry results. The charge is filtered, washed free from salts, dried, and stabilized by slurrying in toluene and heating at 70° C. for 5 days. The pigment is then filtered, vacuum dried to remove the toluene and ground in a micropulverizer using a coarse screen. The final pigment is soft in texture, and does not further crystallize even when boiled under xylene for one hour and has the same crystal structure as the product of Example 1.

Example 8

1 part of crystallized copper phthalocyanine obtained by boiling the acid-pasted product under xylene, filtering and drying, is ball-milled for 24 hours with 5 parts of diatomaceous earth (Celite). Sufficient xylene is then added to form a fluid paste and the ball milling continued for 4 hours. The charge is then blown and the excess of xylene removed by distillation. By adjusting the amount of evaporation a stabilized pigment paste or powder is obtained, which can be added to lacquers or paints with no further grinding, or a minimum of grinding. No change in color value or shade occurs when these lacquers or paints are stored at 25-30° C. for several months and they have the same crystal structure as the product of Example 1.

Example 9

1 part of acid-pasted copper phthalocyanine and 5 parts of Celite (diatomaceous earth) are worked in a dough mixer or chaser mill for 4 to 8 hours with the addition of sufficient xylene to yield a thick paste. This paste can be added directly to paints, etc. without any further treatment. For best results the amount of solvent used in the grinding step must be adjusted to give maximum working of the mix. The resulting paints, etc. are characterized by substantially no change in color value on storage for months and they have the same crystal structure as the product of Example 1.

This application is in part a continuation of my copending application, Serial No. 524,923, filed March 3, 1944, now abandoned, which in turn is a continuation of my application, Serial No. 478,940, filed March 12, 1943, now abandoned, which was copending therewith.

I claim:

1. A method of producing a finely divided, tinctorially strong, halogen free, sulfuric acid stable, metal phthalocyanine pigment, which on prolonged contact with organic liquids capable of producing crystal growth with acid-pasted phthalocyanine pigments will have an average particle size of less than 2 microns, which comprises subjecting the pigment to the action of a crystallizing organic liquid for a sufficient time to grow coarse crystals having an average particle size greater than 2 microns and exhibiting a Robertson type complex X-ray diffraction pattern, subjecting the coarse crystals thus obtained to grinding with a dry grinding aid to produce a pigment having an average particle size below 2 microns and mostly below 1 micron, and subjecting the ground crystalline material to the action of an organic crystallizing liquid.

2. A method of producing a finely divided, tinctorially strong, halogen free, sulfuric acid stable, zinc phthalocyanine pigment, which on prolonged contact with organic liquids capable of producing crystal growth with acid-pasted phthalocyanine pigments will have an average particle size of less than 2 microns, which comprises subjecting the pigment to the action of a crystallizing organic liquid for a sufficient time to grow coarse crystals having an average particle size greater than 2 microns and exhibiting a Robertson type complex X-ray diffraction pattern, subjecting the coarse crystals thus obtained to grinding with a dry grinding aid to produce a pigment having an average particle size below 2 microns and mostly below 1 micron, and subjecting the ground crystalline material to the action of an organic crystallizing liquid.

3. A method of producing a finely divided, tinctorially strong, halogen free, sulfuric acid stable, nickel phthalocyanine pigment, which on prolonged contact with organic liquids capable of producing crystal growth with acid-pasted phthalocyanine pigments will have an average particle size of less than 2 microns, which comprises subjecting the pigment to the action of a crystallizing organic liquid for a sufficient time to grow coarse crystals having an average particle size greater than 2 microns and exhibiting a Robertson type complex X-ray diffraction pattern, subjecting the coarse crystals thus obtained to grinding with a dry grinding aid to produce a pigment having an average particle size below 2 microns and mostly below 1 micron, and subjecting the ground crystalline material to the action of an organic crystallizing liquid.

4. A method of producing a finely divided, tinctorially strong, halogen free, sulfuric acid stable, copper phthalocyanine pigment, which on prolonged contact with organic liquids capable of producing crystal growth with acid-pasted phthalocyanine pigments will have an average particle size of less than two microns which comprises subjecting the pigment to the action of a crystallizing organic liquid for a sufficient time to grow coarse crystals having an average particle size greater than two microns and exhibiting a Robertson type complex X-ray diffraction pattern, subjecting the coarse crystals thus obtained to grinding with a dry grinding aid to produce a pigment having an average particle size below two microns and mostly below one micron, and subjecting the ground crystalline material to the action of an organic crystallizing liquid.

5. A new and improved, solvent stable, tinctorially strong, halogen free, sulfuric acid stable, metal phthalocyanine pigment in highly particulate form, the particles whereof are characterized in that (1) they have an average size of less than two microns; (2) they are crystalline in structure; (3) when exposed to X-rays in an X-ray diffraction apparatus they produce an X-ray diffraction pattern in which the line of maximum intensity corresponds to an interplanar spacing of about 12.7 Å, in which the second most intense line corresponds to an interplanar spacing of about 9.7 Å, and in which the third most intense line corresponds to an interplanar spacing of about 3.75 Å; (4) they retain their average particle size of less than two microns when boiled in xylene for one hour; and (5) they show no substantial changes in tinctorial strength on prolonged storage in contact with crystallizing organic liquids.

6. A new and improved, solvent stable, tinctorially strong, halogen-free, sulfuric acid stable, zinc phthalocyanine pigment in highly particulate form, the particles whereof are characterized in that (1) they have an average size of less than two microns; (2) they are crystalline in structure; (3) when exposed to X-rays in an X-ray diffraction apparatus they produce an X-ray diffraction pattern in which the line of maximum intensity corresponds to an interplanar spacing of about 12.7 Å, in which the second most intense line corresponds to an interplanar spacing of about 9.7 Å, and in which the third most intense line corresponds to an interplanar spacing of about 3.75 Å; (4) they retain their average particle size of less than two microns when boiled in xylene for one hour; and (5) they show no substantial changes in tinctorial strength on prolonged storage in contact with crystallizing organic liquids.

7. A new and improved, solvent stable, tinctorially strong, halogen-free, sulfuric acid stable, nickel phthalocyanine pigment in highly particulate form, the particles whereof are characterized in that (1) they have an average size of less than two microns; (2) they are crystalline in structure; (3) when exposed to X-rays in an X-ray diffraction apparatus they produce an X-ray diffraction pattern in which the line of maximum intensity corresponds to an interplanar spacing of about 12.7 Å, in which the second most intense line corresponds to an interplanar spacing of about 9.7 Å, and in which the third most intense line corresponds to an interplanar spacing of about 3.75 Å; (4) they retain their average particle size of less than two microns when boiled in xylene for one hour; and (5) they show no substantial changes in tinctorial strength on prolonged storage in contact with crystallizing organic liquids.

8. A new and improved, solvent stable, tinctorially strong, halogen-free, sulfuric acid stable, copper phthalocyanine pigment in highly particulate form, the particles whereof are characterized in that (1) they have an average size of less than two microns; (2) they are crystalline in structure; (3) when exposed to X-rays in an X-ray diffraction apparatus they produce an X-ray diffraction pattern in which the line of maximum intensity corresponds to an interplanar spacing of about 12.7 A, in which the second most intense line corresponds to an interplanar spacing of about 9.7 Å, and in which the third most intense line corresponds to an interplanar spacing of about 3.75 Å; (4) they retain their average particle size of less than two microns when boiled in xylene for one hour; and (5) they show no substantial changes in tinctorial strength on prolonged storage in contact with crystallizing organic liquids.

RICHARD H. WISWALL, Jr.

REFERENCES CITED

The following references are of record in the file of this patent:

UNITED STATES PATENTS

| Number | Name | Date |
| --- | --- | --- |
| 2,378,283 | Bucher | June 12, 1945 |
| 2,402,167 | Lang et al. | June 18, 1946 |